United States Patent [19]

Ichiki et al.

[11] Patent Number: 5,435,981
[45] Date of Patent: Jul. 25, 1995

[54] METHOD OF ADSORBING AND REMOVING NITROGEN OXIDES

[75] Inventors: Masayoshi Ichiki, Osaka; Takanobu Watanabe, Kyoto; Atsushi Fukuju, Osaka; Shigenori Onitsuka, Nara; Teruo Iwamoto, Osaka, all of Japan

[73] Assignee: Hitachi Zosen Corporation, Osaka, Japan

[21] Appl. No.: 133,866

[22] Filed: Oct. 12, 1993

[30] Foreign Application Priority Data

Oct. 22, 1992 [JP] Japan ............................ 4-284490

[51] Int. Cl.6 ............................................ C01B 21/20
[52] U.S. Cl. .................... 423/239.1; 423/242.1; 95/92; 95/129
[58] Field of Search ................... 423/239.1, 242.1; 95/92, 117, 129

[56] References Cited

U.S. PATENT DOCUMENTS 4,181,506  1/1980  Bengtsson ................. 423/242.1
5,158,582 10/1992  Onitsuka et al. ............ 95/129

FOREIGN PATENT DOCUMENTS 540428  5/1993  European Pat. Off. .
3407277  8/1985  Germany .
3604946  7/1986  Germany .
3258324 11/1991  Japan .

OTHER PUBLICATIONS

European Patent Application; 0-540-428; May 5, 1993; Adsorbents for Removing low-concentration nitrogen oxides; Onitsuka et al.
Patent Abstract of Japan, vol. 16 No. 61 Feb. 17, 1990 JP-A-03,258,324 Watanabe et al.
Translation of '324 enclosed.
Patent Abstract of Japan, vol. 16, No. 61 (C-910) 17 Feb. 1992 of JP-A-03 258 324 (Kogai Kenko Higai Hoshiyou Yobou Kyokai) 18 Nov. 1991.

Primary Examiner—Ferris Lander
Assistant Examiner—Thomas G. Dunn, Jr.
Attorney, Agent, or Firm—Armstrong, Westerman, Hattori, McLeland & Naughton

[57] ABSTRACT

Disclosed is a method of adsorbing and removing NOx, by washing with water a gas discharged by ventilation from highway tunnels in a washing tower as pretreatment, and then adsorbing NOx in the gas with a rotary NOx adsorption unit. The washed gas may be heated by a heater which is placed between the washing tower and the rotary NOx adsorption unit.

10 Claims, 2 Drawing Sheets

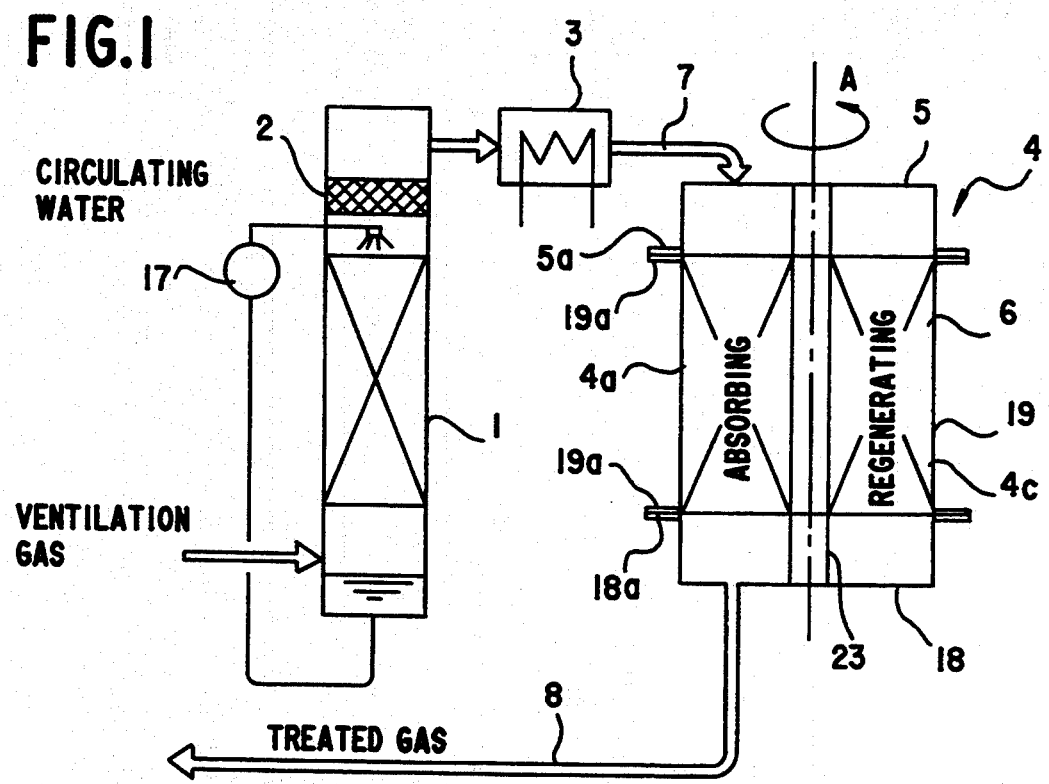
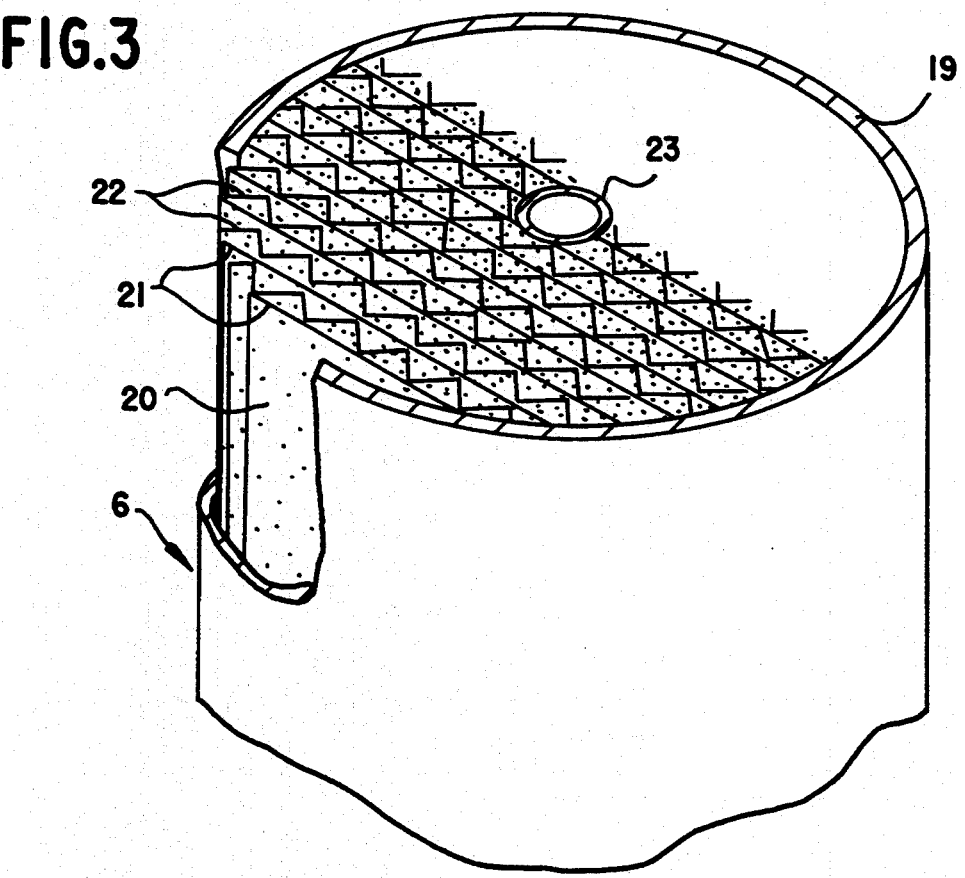

METHOD OF ADSORBING AND REMOVING NITROGEN OXIDES

BACKGROUND OF THE INVENTION

The present invention relates to a method of efficiently adsorbing and removing nitrogen oxides (NOx) which are contained in low concentrations in gases discharged by ventilation from various highway tunnels, mountain tunnels, underwater tunnels, underground roads, sheltered roads and the like (hereinafter referred to collectively as "highway tunnels").

Highway tunnels, especially those having a large length and a great vehicular traffic volume, must be ventilated at a considerable rate in order to assure the drivers and passengers of health and increase the least distance of distinct vision. Air is withdrawn also from tunnels of relatively short length for ventilation to control air pollution due to carbon monoxide (CO), NOx and the like which are concentrically released from the inlet and outlet of the tunnel when the tunnel is located in an urban or suburban area.

However, if the gas discharged by ventilation is released as it is in the neighborhood, the environment of the area concerned will not be improved. In particular, in the urban or suburban area where air pollution due to vehicular exhaust gases spreads along a plane, the dischaged gases could extend to form a highly polluted zone. Exactly the same problem as above will be encountered in the case where roadway tunnels or sheltered tunnels are to be constructed as a pollution control measure for existing roads.

The present invention relates to a method of efficiently adsorbing and removing NOx which is present in low concentrations in gases discharged by ventilation from highway tunnels.

PRIOR ART

The gas released from highway tunnels by ventilation is characterized in that it has a low NOx concentration of about 5 ppm or less and ordinary temperature, and varies greatly in quantity with the volume of traffic.

The inventors have already provided an apparatus for purifying a gas from highway tunnels by ventilation for the purpose of efficiently adsorbing and removing NOx of such a low concentration which comprises a rotary NOx adsorption unit which denitrates the NOx-containing ventilation gas resulting from dehumidification with NOx adsorbent and regenerates the NOx adsorbent (see Unexamined Japanese Patent Publication No. Hei 3-258324). The rotary NOx adsorption unit comprises an NOx adsorbing zone, a preheating zone which preheats the unregenerated adsorbent and is located ahead in the direction of rotation from the NOx adsorbing zone, an adsorbent regenerating zone which is located ahead in the direction of rotation from the preheating zone, and a cooling zone which cools the regenerated adsorbent and is located ahead in the direction of rotation from the regenerating zone.

However, the method using the above mentioned apparatus has a problem in which high concentrations of water (or moisture) causes lowering of the adsorption ability (deterioration phenomena). Hence, it is necessary to cool the untreated gas to 10° C. or lower through washing towers, further to cool the gas to 5° C. or lower with coolers or refrigerators, and reducing the moisture content of the gas to 100 ppm or lower with rotary silica gel dehumidifiers in order to give the great adsorption ability. Accordingly, in this process, it is necessary to provide in addition to the rotary silica gel dehumidifiers, some accessories like coolers or refrigerators of washing water, intermediate coolers or refrigerators of dehumidifiers, coolers or refrigerators of treated gas, heaters for drying silica gel, rotary silica gel dehumidifiers, and heat pump systems for heating and cooling ahead of the rotary NOx adsorption unit.

If an adsorbent which moisture does not affect is developed, miniaturization and energy saving of NOx removing unit will be accomplished and economical effects will be exerted, hence such an excellent adsorbent is desired.

The inventors provided an adsorbent which works well even under such a high moisture content, comprising a carrier comprising gamma-alumina, and ruthenium supported on the carrier (Unexamined Japanese Patent Publication No. Hei 5-31357). However, the adsorption ability of this adsorbent deteriorates because the alumina (aluminium oxide: $Al_2O_3$) as carrier is sulfurized by sulfur oxides (SOx) contained in the treated gases.

As a countermeasure against the abovementioned problem, the inventors provided an adsorbent which comprises ceramic paper holding thereto a carrier comprising anatase-type titania, and ruthenium supported on the carrier (Unexamined Japanese Patent publication Nos. Hei 5-123568 and Hei 5-123569). Though the adsorption ability of this adsorbent is excellent in the initial period, it deteriorates greatly by exposing the adsorbent with the exhaust gas having a temperature of higher than 250° C. for a long time. The cause of the deterioration seems to be that halogens of ruthenium halides, which are active components, are eliminated from ruthenium halides under high temperature conditions, and the resulting $RuO_2$ exhibits very little activity.

Hence, the inventors provided an adsorbent which maintains high activity without the loss of halogens from ruthenium halides even under such high temperature conditions, comprising ceramic paper holding thereto a carrier comprising anatase-type titania, and a ruthenium halide and a halide of at least one additional metal co-supported on the ceramic paper (Japanese patent application No. Hei 4-10312). Though the adsorption ability of this adsorbent does not deteriorate at moisture contents of less than 3%, it is slightly poisoned by $SO_2$ which co-exists.

In view of the foregoing situation, accordingly, one object of the present invention is to provide a method of adsorbing and removing NOx in which as many of the accessories of rotary NOx adsorption unit can be omitted as possible, $SO_2$ in ventilation gases can be removed upstream from the rotary NOx adsorption process, the regeneration conditions can be appropriately set according to the properties of NOx adsorbent, and energy saving and simplification of the whole system can be accomplished.

SUMMARY OF THE INVENTION

The present invention provides a method of adsorbing and removing NOx, which comprises washing with water gases discharged by ventilation from highway tunnels in a washing tower as a pretreatment, and then adsorbing NOx in the gases with a rotary NOx adsorption unit.

The washed gases can be heated by a heater which is placed between the washing tower and the rotary NOx adsorption unit.

The rotary NOx adsorption unit may preferably comprise:
- an upper cover which is located at one end of the NOx adsorption unit,
- a lower cover which is located at the other end of the NOx adsorption unit opposite to the upper cover, and
- a NOx adsorbent rotor which is disposed rotatably in a space between the upper cover and the lower cover.

The NOx adsorbent rotor through which gases are passed may axially comprise a generally cylindrical shell and an adsorbent which is charged in the shell.

The space between the upper and lower covers, in which the NOx adsorbent rotor is disposed, may comprise:
- a NOx adsorbing zone which communicates with an ventilation gas introducing conduit so as to adsorb the NOx contained in the washed gas,
- a preheating zone which is located ahead in the direction of rotation of the NOx adsorbent rotor from the NOx adsorbing zone and communicates with a preheating gas introducing conduit so as to preheat the unregenerated adsorbent,
- an adsorbent regenerating zone which is located ahead in the direction of rotation of the NOx adsorbent rotor from the preheating zone and communicates with a regenerating gas introducing conduit so as to heat the adsorbent further and desorb the adsorbed NOx, and
- a cooling zone which is located ahead in the direction of rotation of the NOx absorbent roter from the regenerating zone and communicates with a cooling gas introducing conduit so as to cool the regenerated adsorbent.

Each portion of the adsorbent rotor may rotate so as to pass through each zone in turn with rotation.

The rotary NOx adsorption unit can be contained in a casing thereof.

As a heat source of the heater, waste heat of the regenerating zone or waste heat of a cooler of circulating water of the washing tower or both can be used.

A heated atmosphere having a $SO_2$ concentration of 0.1 ppm or less can be allowed to flow through the preheating zone. The direction of the gas flow in the preheating zone is preferably opposite to that of the gas flow in the adsorbing zone. The gas temperature at the inlet of the preheating zone is preferably 175° C. or lower.

A heated atmosphere having a $SO_2$ concentration of 0.1 ppm or less can be allowed to flow through the regeneration zone. The direction of the gas flow in the regenerating zone is preferably opposite to that of the gas flow in the adsorbing zone. The gas temperature at the inlet of the regenerating zone is preferably 180° to 300° C.

The gas leaving the regenerating zone is preferably treated with an auxiliary denitration reactor having a $NH_3$ supplying unit.

The gas treated with the auxiliary denitration reactor is preferably heat-exchanged with the gas which goes out from the regenerating zone.

The present invention also provides a system for adsorbing and removing NOx contained in gases discharged by ventilation from highway tunnels.

BRIEF DESCRIPTION OF DRAWINGS

FIG. 1 on a first drawing sheet is a flow chart showing an embodiment of the invention.

FIG. 3 on the first drawing sheet is a perspective view showing an adsorbent rotor.

DESCRIPTION OF PREFERRED EMBODIMENTS OF THE INVENTION

Figure 2:
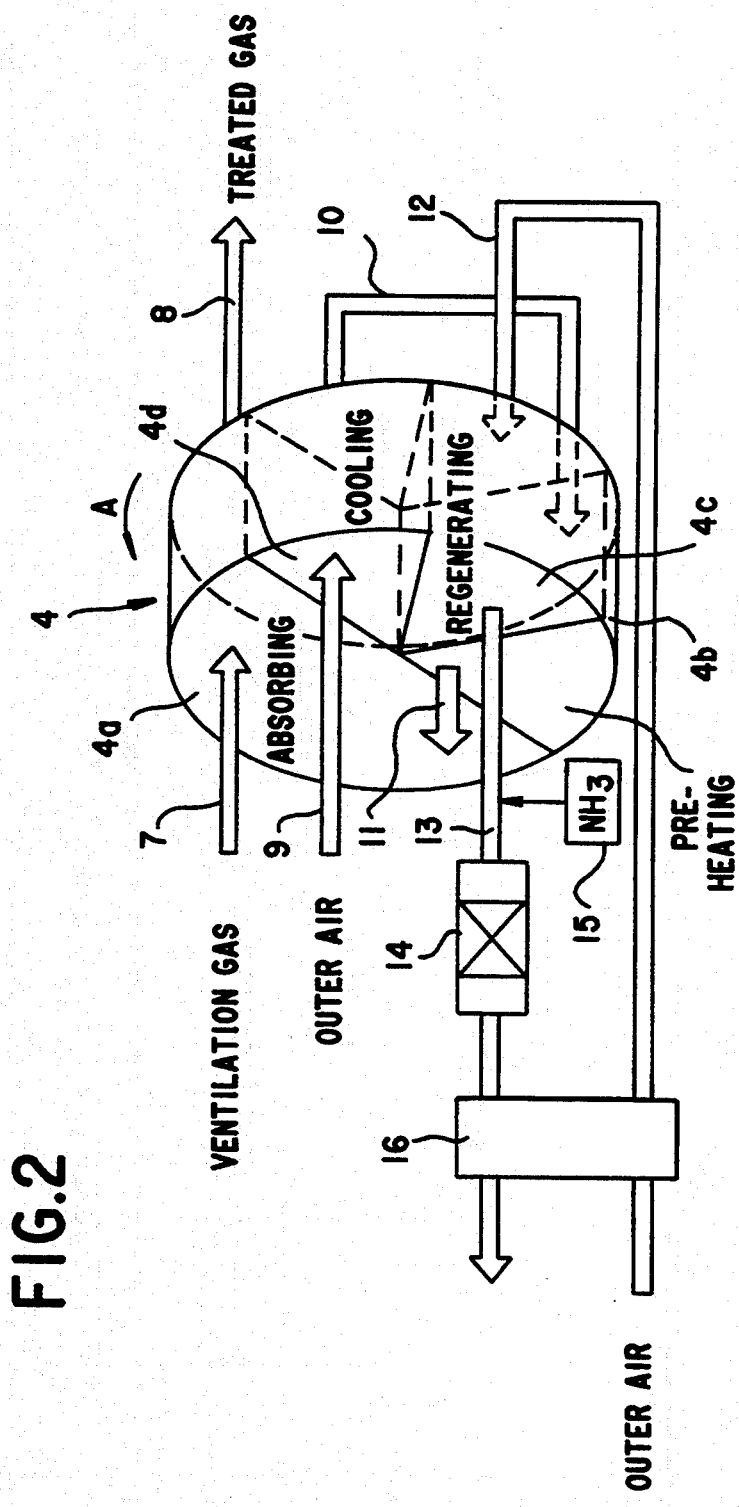
FIG. 2 on a second drawing sheet is a perspective view showing a rotary NOx adsorption unit.

The present invention provides a method of adsorbing and removing NOx, comprising washing with water gases discharged by ventilation (typically polluted air) from highway tunnels in a washing tower 1 as pretreatment, and then adsorbing NOx in the gases with a rotary NOx adsorption unit 4.

The washing tower plays the role of removing crude solid material from the ventilation gas efficiently, and at the same time absorbing and removing almost all coexisting $SO_2$. The washing tower also lowers and stabilizes the moisture content in the gas by contacting the ventilation gas with cool water, that is, the ventilation gas comes into contact with cool water, for example, having temperature of 5° to 15° C. in the washing tower and is cooled, for example, to 6° to 17° C., preferably 8° to 12° C.

Rotary NOx adsorption unit 4 according to a preferred embodiment of the present invention shown in the drawings comprises an upper cover 5 having a sliding flange 5a at the lower end, a lower cover 18 having a sliding flange 18a at the upper end, a NOx adsorbent rotor 6 which is disposed rotatably in a space between the upper cover 5 and the lower cover 18, and the supporting axis 23. NOx adsorbent rotor 6 comprises a shell 19 having sliding flanges 19a at the both ends respectively, and a cylindrical honeycomb type adsorbent 20 which is charged in the shell. Gases pass through the rotor 6 axially. NOx adsorbent rotor 6 is made rotatable in the direction A against the covers by sliding between the upper flange 19a and the sliding flange 5a and between the lower flange 19a and the sliding flange 18a.

Each of covers 5 and 18 is provided with plural partitions in it. These partitions are mounted so as to define the following four zones in the space between the upper cover 5 and the lower cover 18;
- an adsorbing zone 4a,
- a preheating zone 4b which is located ahead in the direction of rotation of the rotor from the NOx adsorbing zone 4a and preheats the unregenerated adsorbent to a specified temperature,
- an adsorbent regenerating zone 4c which is located ahead in the direction of rotation of the rotor from the preheating zone 4b, heats the adsorbent further and desorbs the adsorbed NOx, and
- a cooling zone 4d which is located ahead in the direction of rotation of the rotor from the regenerating zone 4c and cools the hot regenerated adsorbent to a suitable temperature for adsorption.

The adsorbent rotor 6 is disposed concentrically with the covers 5 and 18 in a casing.

The rotary NOx adsorption unit 4, with rotation of the adsorbent rotor 6, serves to supply fresh adsorbent continuously to the adsorbing zone 4a, through which the pretreated gas flows, at the same time to remove the used adsorbent which has adsorbed NOx from the adsorbing zone 4a to the regenerating zone 4c.

The moisture content in the gas at the outlet of the washing tower is nearly saturated (relative humidity=100%), and thereby a large amount of moisture together with NOx is condensed and captured in pores of the adsorbent, if the gas is passed to the adsorbent as it is. This leads to an increase of heat energy needed to regenerate the adsorbent. As a countermeasure, a heater 3 may be placed between the washing tower 1 and the rotary NOx adsorption unit 4, whereby the washed gas is heated to a higher temperature than that at the washing tower, for example, by 3° to 5° C. after demisting. The relative humidity may be reduced, for example, to 70% or less by the heating, so that the moisture does not condense in the pores of the adsorbent, and the energy for regenerating the adsorbent can be saved. As a heat source of the heater 3, waste heat of the regenerating zone 4c and/or waste heat of a cooler or a refrigerator of circulating water of the washing tower 1 can be used.

A heated gas (typically air) having a low $SO_2$ concentration (for example 0.1 ppm or less) is allowed to flow through the preheating zone 4b, the gas flow direction in the preheating zone is preferably opposite to that in the adsorbing zone 4a, and the gas temperature at an inlet of the preheating zone is 175° C. or lower, preferably 120° to 140° C.

A heated gas (typically air) having a low $SO_2$ concentration (for example 0.1 ppm or less) is allowed to flow through the regeneration zone 4c, the gas flow direction in the regenerating zone is preferably opposite to that in the adsorbing zone 4a, and the gas temperature at an inlet of the regenerating zone is 180° to 300° C., preferably 200° to 250° C.

The gas leaving the outlet of the regenerating zone 4c may be treated with an auxiliary denitration reactor 14 having a $NH^3$ supplying unit 15.

The gas treated with the auxiliary denitration reactor 14 may be heat-exchanged with the outlet gas of the regenerating zone 4c.

Almost all SOx contained in the ventilation gas is removed with the washing tower, and remaining SOx is adsorbed by the NOx adsorbent. This SOx adsorption takes place at the inlet portion of the adsorbent rotor 6, so that the influence of the SOx adsorption on the NOx adsorption does not extend to the whole of the adsorbent rotor. More than half of the adsorbed SOx is desorbed in the preheating zone from the adsorbent rotor 6. As described above, it is effective that the direction of gas flow in the preheating zone 4b is opposite to that in the adsorbing zone 4a in order to remove the desorbed SOx immediately without contacting the desorbed SOx with the other portion of the adsorbent rotor 6. The remaining SOx changes into sulfuric acid or sulfates by heating at temperature of 175° C. or higher. The resulting sulfuric acid or sulfate is hard to desorb from the adsorbent and lowers the ability of the adsorbent. Accordingly, a gas without SOx is favorable as high temperature gases which are made to flow through the regenerating zone 4c, so that it is not preferable to use ventilation gases but preferable to use heated atmosphere or fresh outer air.

The ventilation gas is introduced from the washing tower to the rotary NOx adsorption unit, and released to the outside after NOx adsorption and removal.

A preferred example of the adsorbent for use comprises ceramic paper holding thereto a carrier comprising anatase-type titania, and a ruthenium halide and a halide of at least one additional metal co-supported on the ceramic paper, the additional metal being selected from the group consisting of potassium, sodium, magnesium, calcium, manganese, copper, zinc, rubidium, zirconium, barium, cerium and molybdenum. (The halide of additional metal will hereinafter be referred to as a "addition metal halide".)

The adsorbent is prepared by impregnating ceramic paper with anatase-type titania sol to cause the paper to retain the sol, drying or baking the impregnated ceramic paper, subsequently impregnating the carrier-holding ceramic paper with the ruthenium halide and the addition metal halide, and drying or baking the resulting paper.

The ceramic paper is prepared from ceramic fibers by the papermaking process. Ceramic papers commercially available are also usable.

Examples of anatase-type titanias useful as carriers are titania prepared from hydrated titania (titanic acid slurry) which is an intermediate product from the sulfuric acid process for producing titania, and titania prepared from titania sol obtained by deflocculating and stabilizing the titania acid slurry.

The adsorbent tends to exhibit a higher NOx adsorbing property as the amount of anatase-type titania retained thereon increases. If the amount of anatase-type titania is less than 20 $g/m^2$, a markedly impaired NOx adsorbing property will result, so that the amount is preferably at least 20 $g/m^2$, more preferably 25 to 500 $g/m^2$.

The amount of ruthenium to be supported is preferably at least about 0.01 wt. %, more preferably about 0.1 to about 5 wt. %, calculated as ruthenium metal and based on the adsorbent.

The amount of addition metal halide to be supported is preferably at least about 0.1 wt. %, more preferably about 1 to about 10 wt. %, calculated as the metal and based on the adsorbent.

The ruthenium halide and the addition metal halide are caused to be co-supported on the ceramic paper generally by dissolving or dispersing the ruthenium halide, such as ruthenium chloride ($RuCl_3$), and the addition metal halide, such as the chloride of the above-mentioned metal, in a suitable medium to obtain an immersion bath of the mixture, and immersing the carrier in the bath. This method, however, is not limitative. Instead, the ruthenium halide and the addition metal halide can be supported on the ceramic paper independently.

The immersed carrier is thereafter withdrawn from the bath, washed with water and dried in air at about 100° to about 120° C. The dried product is baked at about 250° to about 500° C. when so required.

In treating large quantities of gases such as ventilation gases from highway tunnels, it is required that the adsorbent be diminished in the resistance to the gas flow to ensure a minimized pressure loss. An adsorbent preferable for use in this case is one comprising a flat sheet-corrugated sheet multilayer structure having a honeycomb cross section, and a ruthenium halide and an addition metal halide co-supported on the structure, the multilayer structure being composed of alternately arranged flat sheets of ceramic paper retaining a carrier of anatase-type titania thereon and corrugated sheets of ceramic paper retaining the same carrier thereon. However, the adsorbent which is used in this invention is not limited to the above mentioned adsorbent.

The auxiliary denitration reactor 14 is a reactor which reduces catalytically NOx to $N_2$ and $H_2O$ under denitration catalyst using $NH_3$ as a reducing agent.

EXAMPLE

The present invention will be explained in detail with reference to the following example.

(a) NOx adsorbing and removing system

FIG. 1 shows an example of the NOx adsorbing and removing system of the gas released from highway tunnels by ventilation.

In the system, the unpurified gas which contains NOx is introduced in the lower portion of the washing tower 1, and while moving upward, it comes into contact with cool water sprayed in the tower. The water has a temperature of 5° to 15° C., and thereby the gas is cooled to 8° to 12° C. The gas is demisted by the demister provided in the upper portion of the tower, then sent to the heater 3 and thereby heated to a higher temperature than that of the washing tower by 3° to 5° C. This heating makes the relative humidity 70% or less, hinders the condensation of moisture in the pores of the adsorbent, and makes it possible to save energy for regeneration. As a heat source of the heater, waste heat of the regenerating zone 4c which will be described later, or waste heat of a cooler of circulating water of the washing tower 1 or both are used. The water from the lower portion of the washing tower 1 is forced upward to cooler refrigerator 17, and the cooled water is recycled to the upper portion of the tower.

The constitution of the rotary NOx adsorption unit 4 to which the heated ventilation gas is introduced will be described with reference to FIGS. 1 to 3.

Rotary NOx adsorption unit 4 comprises an upper cover 5 having a sliding flange 5a at the lower end, a lower cover 18 having a sliding flange 18a at the upper end, a NOx adsorbent rotor 6 which is disposed rotatably in a space between the upper cover 5 and the lower cover 18, and the supporting axis 23. The upper cover 5 is located at the one end of the rotary NOx adsorption unit 4 and the lower cover 18 is located at the other end of the unit 4 so that they may be opposite to each other. NOx adsorbent rotor 6 comprises a cylindrical shell 19 having sliding flanges 19a at the both ends respectively, and a honeycomb type adsorbent 20 which is charged in the shell. Gases pass through the rotor 6 axially. NOx adsorbent rotor 6 is made rotatable in the direction A by sliding between the upper flange 19a of the shell 19 and the sliding flange 5a of the upper cover 5 and between the lower flange 19a of the shell 19 and the sliding flange 18a of the lower cover 18. The rotary NOx adsorption unit 4 is contained in a casing thereof.

Each of the covers 5 and 18 is provided with plural partitions in it. These partitions are mounted so as to define the following four zones in the space between the upper cover 5 and the lower cover 18, in which the rotor 6 is disposed;

an adsorbing zone 4a having a semicircular cross section as it is seen axially thereof, a preheating zone 4b which is located ahead in the direction of rotation of the rotor from the NOx adsorbing zone 4a and heats the unregenerated adsorbent to a specified temperature, an adsorbent regenerating zone 4c which is located ahead in the direction of rotation of the rotor from the preheating zone 4b, and heats the adsorbent further so as to desorb the adsorbed NOx, and a cooling zone 4d which is located forward in the direction of rotation of the rotor from the regenerating zone 4c and cools the hot regenerated adsorbent to a suitable temperature for adsorption.

The preheating zone 4b, the adsorbent regenerating zone 4c and the cooling zone 4d each have a sectorial cross section and are provided by the respective one-third portions of the other half of the rotor 4.

The adsorbent rotor 6 is disposed concentrically with the covers 5 and 18 in the space in the casing and each portion of the rotor rotates so as to pass through each zone in turn with rotation.

In FIG. 2, the portion of the rotor which is located in the NOx adsorbing zone 4a is the NOx adsorbing portion. The portion which is located in the preheating zone 4b is the preheating portion. The portion which is located in the regenerating zone 4c is the regenerating portion. The portion which is located in the cooling zone 4d is the cooling portion.

A ventilation gas introducing conduit 7 is so disposed that the ventilation gas flows from the heater 3 to the rotary NOx adsorption unit 4, and a treated gas discharging conduit 8 is so disposed that the treated gas flows from NOx adsorbing zone 4a to the atmosphere.

A cooling gas introducing conduit 9 is so disposed that outer air for cooling NOx adsorbent flows from the outside to the cooling zone 4d, a preheating gas introducing conduit 10 is so disposed that the preheating gas flows from the cooling zone 4d to the preheating zone 4b, and a preheating gas discharging conduit 11 is so disposed that the gas used for preheating flows from the preheating zone 4b to the atmosphere.

The preheating gas introducing conduit 10 is located in the opposite side to the ventilation gas introducing conduit 7 interposing the rotary NOx adsorption unit 4, so that the gas flow direction in the preheating zone 4b is opposite to that in the adsorbing zone 4a.

A regenerating gas introducing conduit 12 is so disposed that outer air for regenerating NOx adsorbent flows from the outside to the regenerating zone 4c, and a regenerating gas discharging conduit 13 is so disposed that the gas used for regeneration flows from the regenerating zone 4c to the atmosphere.

The regenerating gas introducing conduit 12 is located in the opposite side to the ventilation gas introducing conduit 7 interposing the rotary NOx adsorption unit 4, so that the regenerating gas flow direction in the regenerating zone 4c is opposite to that in the adsorbing zone 4a.

An auxiliary denitration reactor 14 and a $NH_3$ supplying unit 15 being upstream from the reactor are disposed on the regenerating gas discharging conduit 13.

A heat exchanger 16 for heat recovery is provided across the regenerating gas introducing conduit 12 and the upstream portion from the reactor 14 on the regenerating gas discharging conduit 13.

In the above-mentioned constitution of the rotary NOx adsorption unit, a heated atmosphere having a $SO_2$ concentration of 0.1 ppm or less is allowed to flow through the cooling zone 4d and the preheating zone 4b, and the gas temperature at the inlet of the preheating zone 4b is 120° to 140° C.

A heated atmosphere having a $SO_2$ concentration of 0.1 ppm or less is allowed to flow through the regenerating zone 4c, and the gas temperature at the inlet of the regenerating zone 4c is 200° to 250° C.

A ventilation gas containing NOx is introduced from the heater 3 into the adsorbing zone 4a of the rotary NOx adsorption unit 4 through the ventilation gas introducing conduit 7, and NOx in the ventilation gas is adsorbed and removed by the NOx adsorbing portion of the adsorbent rotor 6 in the zone. The preheating portion of the adsorbent rotor 6 which has adsorbed NOx is preheated by the outer air coming through the preheating gas introducing conduit 10 in the preheating zone 4b and the regenerating portion is regenerated by the outer air coming through the regenerating gas introducing conduit 12 in the regenerating zone 4c. If necessary, the adsorbent rotor and the outer air are heated by a heater to an appropriate temperature 100° to 300° C. ) prior to the regeneration.

The cooling portion of the adsorbent rotor 6 which has been regenerated is cooled by the outer air coming through the cooling gas introducing conduit 9 in the cooling zone 4d. Thus, the denitration of the ventilation gas containing NOx, and the preheating, regenerating and cooling of the NOx adsorbent rotor are conducted continuously with rotation.

The desorbed NOx in the purge gas released from the regenerating zone 4c is denitration-treated (reduced to harmless gas) with $NH_3$ from the $NH_3$ supplying unit 15 in the auxiliary denitration reactor 14. The regenerated gas and the gas entering the regenerating zone 4c are heat-exchanged with the heat exchanger 16.

The gas released from the regenerating zone 4c and the gas released from the preheating zone 4b are introduced into the lower portion of the washing tower 1 together with unpurified gas.

(b) Preparation of adsorbent rotor

Commercial ceramic paper (manufactured by Japan inorganic Co., Ltd., composed of silica and alumina (50:50), having a thickness of 0.25 and weighing 46 g/m$^2$)was cut to a predetermined size, and the cut sheet was immersed in an anatase-type titania sol ($TiO_2$ content: about 30 wt. % ) at room temperature. The ceramic paper was thereafter immediately placed onto a flat plate, treated with a roller or the like to remove an excess of titania sol and thereby made uniform in thickness, and dried in hot air at the same time. The ceramic paper impregnated with the titania sol and thus prepared in the form of a flat sheet was placed into an electric oven and baked in air at 400° C. for 3 hours to obtain a flat sheet of titania-retaining ceramic paper.

The same ceramic paper as above and immersed in the anatase-type titania sol was withdrawn from the sol, placed on a corrugated plate and thereafter treated in the same manner as above to obtain a corrugated sheet of titania-retaining ceramic paper.

The amount of $TiO_2$ retained on the paper was determined from the difference between the weight of paper before the immersion in the titania sol and the weight thereof after baking, with the result that 85 g/m$^2$ of $TiO_2$ was found retained on the paper.

The same procedure as above was repeated to prepare flat sheets of titania-retaining ceramic paper having varying widths and corrugated sheets of titania-retaining ceramic paper also having varying widths. Subsequently, as shown in FIG.. 3, the flat sheets 21 and corrugated sheets 22 of predetermined widths were alternately arranged in layers into a cylindrical assembly to obtain an adsorbent support consisting of flat sheet-corrugated sheet multilayer structure having a honeycomb cross section (geometric surface area: 0.0385 m$^2$, $TiO_2$ content: 3.3 g).

The adsorbent support of multi layer structure was immersed in 100 ml of an aqueous solution of ruthenium chloride ($RuCl_3$), 0.38 wt. % in Ru concentration and manganese chloride ($MnCl_2$), 2.07 wt. % in Mn concentration, at room temperature for 30 minutes, then washed with water and thereafter dried at about 110° C. for 2 hours to obtain a Ru-Mn-cosupporting titania honeycomb adsorbent 20 (amount of Ru supported: 0.55 wt. %, amount of Mn supported: 3.00 wt. %).

The honeycomb adsorbent 20 was fitted into shell 19, subsequently treated at about 300° C. for 1 hour while passing dry air (moisture content: about 50 ppm) through the tube at 2.5 normal liter/min and then allowed to cool to room temperature.

Thus, the adsorbent rotor 6 was prepared.

What is claimed is:

1. (Amended) A method of adsorbing and removing NOx contained in a gas discharged by ventilation from a highway tunnel, the gas containing solid material and $SO_2$ in addition to the NOx, which method comprises the steps of:

washing the discharged gas with water in a washing tower as a pretreatment, thereby removing the solid material and $SO_2$, and cooling and saturating the gas with moisture to produce washed gas, heating the washed gas by a heater, and then adsorbing the NOx contained in the washed gas with a rotary NOx adsorption unit, wherein the adsorption unit contains a ceramic paper absorbent having a carrier made of anatase titania and ruthenium halide and a halide of at least one metal cosupported on the ceramic paper, the additional metal being selected from the group consisting of potassium, sodium, magnesium, zirconium, barium, cerium, and molybdenum.

2. A method according to claim 1, in which the rotary NOx adsorption unit comprises:

an upper cover at an upper end of the NOx adsorption unit, a lower cover at a lower end of the NOx adsorption unit, and a NOx adsorbent rotor rotatably mounted in a space between the upper cover and the lower cover, the NOx adsorbent rotor allowing the washed gas to pass therethrough and comprising a generally cylindrical shell and said adsorbent charged therein, wherein:

the space between the upper and lower covers, in which the rotor is mounted, comprises:

a NOx adsorbing zone which communicates with a conduit for introducing said washed gas so as to adsorb the NOx contained in the washed gas, a preheating zone which is located forward in the direction of rotation of the rotor from the NOx adsorbing zone and communicates with a conduit for introducing a preheating gas so as to preheat unregenerated adsorbent, an adsorbent regenerating zone which is located forward in the direction of rotation of the rotor from the preheating zone and communicates with a conduit for introducing a regenerating gas so as to regenerate the adsorbent by heating the adsorbent further and desorbing the adsorbed $NO_x$, and a cooling zone which is located forward in the direction of rotation of the rotor from the regenerating zone and communicates with a conduit for introducing a cooling gas so as to cool the regenerated adsorbent.

3. A method according to claim 2, wherein waste heat of the regenerating zone or waste heat of a cooler of circulating water of the washing tower or both are used as a heat source of the heater.

4. A method according to claim 2, wherein a preheated gas having a $SO_2$ concentration of 0.1 ppm or less is allowed to flow through the preheating zone, the direction of the gas flow in the preheating zone being opposite to that of the preheating gas flow in the adsorbing zone, and the heated gas temperature at an inlet of the preheating zone being 175° C. or lower.

5. A method according to claim 2, wherein a regenerating gas having a $SO_2$ concentration of 0.1 ppm or less is allowed to flow through the regenerating zone, the direction of the regenerating gas flow in the regeneration zone being opposite to that of the heated gas flow in the adsorbing zone, and the regenerating gas temperature at an inlet of the regenerating zone being 180° to 300° C.

6. A method according to claim 2, wherein the gas leaving the regenerating zone is treated with $NH_3$ in an auxiliary denitration reactor having a $NH_3$ supplying unit.

7. A method according to claim 5, wherein the gas treated with the auxiliary denitration reactor is heat-exchanged with the gas which comes out from the regenerating zone.

8. A method of adsorbing and removing NOx contained in air discharged by ventilation from a highway tunnel, the air being polluted with solid material and $SO_2$ in addition to the NOx and having generally ambient temperature, which method comprises the steps of:
   washing the discharged air with water having a temperature of 5° to 15° C. in a washing tower as a pretreatment, thereby removing the solid material and $SO_2$ and cooling and saturating the air with moisture to produce washed air,
   heating the washed air to reduce the relative humidity of the washed air to 70% or less to produce heated air, and
   introducing the heated air into a rotary NOx adsorption unit comprising:
   an upper cover at an upper end,
   a lower cover at a lower end, and
   an NOx adsorbent rotor rotatably mounted in a space between the upper and lower covers, the NOx adsorbent rotor allowing the heated air to pass therethrough and comprising a generally cylindrical sheet and a honeycomb adsorbent comprising ceramic paper having a carrier made of anatase titania and ruthenium halide and a halide of at least one metal co-supported on the ceramic paper, the additional metal being selected from the group consisting of potassium, sodium, magnesium, zirconium, barium, cerium, and molybdenum charged therein, wherein
   the space between the upper and lower covers, in which the rotor is mounted, comprises:
   an NOx adsorbing zone which communicates with a conduit for introducing said heated gas so as to adsorb the NOx contained in the heated air,
   a preheating zone which is located forward in the direction of rotation of the rotor from the NOx adsorbing zone and communicates with a conduit for introducing a preheating gas so as to preheat unregenerated adsorbent,
   an adsorbent regenerating zone which is located forward in the direction of rotation of the rotor from the preheating zone and communicates with a conduit for introducing a regenerating gas so as to regenerate the adsorbent by heating the adsorbent further and desorbing the adsorbed NOx, and
   a cooling zone which is located forward in the direction of rotation of the rotor from the regenerating zone and communicates with a conduit for introducing a cooling gas so as to cool the regenerated adsorbent.

9. A method according to claim 7, wherein a preheating gas having a $SO_2$ concentration of 0.1 ppm or less is allowed to flow through the preheating zone, the direction of the gas flow in the preheating zone being opposite to that of the heated gas flow in the adsorbing zone, and the preheating gas temperature at an inlet of the preheating zone being 175° C. or lower; and
   a regenerating gas having a $SO_2$ concentration of 0.1 ppm or less is allowed to flow through the regenerating zone, the direction of the gas flow in the regeneration zone being opposite to that of the heated gas flow in the adsorbing zone, and the regenerating gas temperature at an inlet of the regenerating zone being 180° to 300° C.

10. A method according to claim 8, wherein the gas leaving the regenerating zone is treated with $NH_3$ in an auxiliary denitration reactor having a $NH_3$ supplying unit; and
   the gas treated with the auxiliary denitration reactor is heat-exchanged with the gas which comes out from the regenerating zone.

* * * * *